(12) United States Patent
Yamada et al.

(10) Patent No.: US 10,860,580 B2
(45) Date of Patent: Dec. 8, 2020

(54) INFORMATION PROCESSING DEVICE, METHOD, AND MEDIUM

(71) Applicant: MURAKUMO CORPORATION, Tokyo (JP)

(72) Inventors: Hiroyuki Yamada, Tokyo (JP); Yohei Tsutsumi, Tokyo (JP)

(73) Assignee: MURAKUMO CORPORATION, Tokyo (JP)

( * ) Notice: Subject to any disclaimer, the term of this patent is extended or adjusted under 35 U.S.C. 154(b) by 827 days.

(21) Appl. No.: 15/499,218

(22) Filed: Apr. 27, 2017

(65) Prior Publication Data

US 2017/0228427 A1    Aug. 10, 2017

Related U.S. Application Data

(63) Continuation of application No. PCT/JP2014/078647, filed on Oct. 28, 2014.

(51) Int. Cl.
| | |
|---|---|
| *G06F 16/2453* | (2019.01) |
| *G06F 16/21* | (2019.01) |
| *G06F 16/22* | (2019.01) |
| *G06F 16/23* | (2019.01) |
| *G06F 9/50* | (2006.01) |

(Continued)

(52) U.S. Cl.
CPC .......... *G06F 16/24542* (2019.01); *G06F 9/50* (2013.01); *G06F 9/505* (2013.01); *G06F 12/00* (2013.01); *G06F 16/00* (2019.01); *G06F 16/219* (2019.01); *G06F 16/2282* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 2004/0088334 A1 | 5/2004 | Klein | |
| 2009/0222458 A1 | 9/2009 | Hattori | |
| 2009/0327214 A1* | 12/2009 | Richardson | ....... G06F 16/24545 |

(Continued)

FOREIGN PATENT DOCUMENTS

| | | |
|---|---|---|
| JP | 2000-259672 A | 9/2000 |
| JP | 2001-5827 A | 1/2001 |

(Continued)

OTHER PUBLICATIONS

Notice of Reason for Rejection dated Nov. 13, 2018, issued in counterpart Japanese Application No. 2016-556087, with English translation. (7 pages).

(Continued)

*Primary Examiner* — Mark D Featherstone
*Assistant Examiner* — Samuel C Sharpless, III
(74) *Attorney, Agent, or Firm* — Westerman, Hattori, Daniels & Adrian, LLP

(57) ABSTRACT

An information processing device allocates each portion of a table used in query processing with respect to a database managed by the information processing device, as a portion under responsibility of each of a plurality of other information processing devices, and instructs the plurality of other information processing devices to perform processing with respect to the portion under responsibility by referring to another synchronized database managed by each of the plurality of other information processing devices.

6 Claims, 9 Drawing Sheets

(51) Int. Cl.
G06F 12/00 (2006.01)
G06F 16/00 (2019.01)

(56) References Cited

U.S. PATENT DOCUMENTS

| | | | | |
|---|---|---|---|---|
| 2011/0307470 | A1* | 12/2011 | Kamimura | G06F 16/27 707/713 |
| 2013/0117307 | A1* | 5/2013 | Vishnoi | G06F 16/2343 707/770 |
| 2013/0262443 | A1* | 10/2013 | Leida | G06F 16/24534 707/722 |
| 2014/0099938 | A1* | 4/2014 | Calo | G06F 16/2246 455/422.1 |

FOREIGN PATENT DOCUMENTS

| | | |
|---|---|---|
| JP | 2003-108165 A | 4/2003 |
| JP | 2006-505059 A | 2/2006 |
| JP | 2009-211154 A | 9/2009 |
| WO | 2010/098034 A1 | 9/2010 |

OTHER PUBLICATIONS

International Search Report dated Jan. 13, 2015, issued in counterpart International Application No. PCT/JP2014/078647 (1 page).

* cited by examiner

INFORMATION PROCESSING DEVICE, METHOD, AND MEDIUM

CROSS-REFERENCE TO RELATED APPLICATION

This application is a continuation application of International Application PCT/JP2014/078647 filed on Oct. 28, 2014 and designated the U.S., the entire contents of which are incorporated herein by reference.

FIELD

The present disclosure relates to a technique for load distribution.

BACKGROUND

Conventionally, a distributed search device which distributes a search range of information is proposed, the distributed search device including: first accepting means for accepting a search request for requesting a search for information; information searching means for searching for the information for which a search is requested by the search request accepted by the first accepting means, within a search range for which the information searching means itself is responsible; first search requesting means for requesting another distributed search device on a network to perform the search requested by the search request accepted by the first accepting means; device information storing means for storing device information for specifying the other distributed search device which is requested to perform the search by the first search requesting means; and updating means for updating the device information stored in the device information storing means, wherein when requesting another distributed search device to perform a search, the first search requesting means requests another distributed search device specified by the device information stored in the device information storing means to perform the search (refer to Japanese Patent Application Publication No. 2001-005827).

In addition, there are proposed a technique for distributing a search object among a plurality of devices and processing the search object in parallel (refer to Japanese Patent Application Publication No. 2000-259672), a technique in which a management computer having received a search query instructs an appropriate search range to melody searching means of each guest room system, causes the melody searching means to share search processing, and integrates a search result reported by the melody searching means of the guest room system to create a search report representing a search result of all search ranges (refer to Japanese Patent Application Publication No. 2003-108165), and the like.

SUMMARY

Conventionally, in order to distribute a load on an entire system, a system provided with a plurality of information processing devices capable of accepting and executing a query is used. According to such a system, even when a large number of queries are processed in parallel, if the queries have relatively small processing loads, the processing loads can be distributed by distributing the queries among the plurality of information processing devices.

However, with a conventional system, processing of individual queries must be executed by a single information processing device even if a query has a relatively large processing load and the processing load cannot be distributed.

A technique according to the present disclosure takes the problem described above into consideration and an object thereof is to distribute a processing load related to a single query among a plurality of information processing devices.

In order to solve the problem described above, the present disclosure adopts the following means. Specifically, an information processing device according to the present disclosure includes: database managing means for managing a database; allocating means for allocating each of a plurality of portions included in a table used in processing related to a query to the database, as a portion under responsibility of each of a plurality of other information processing devices; instructing means for causing the plurality of other information processing devices to perform distributed execution of the processing by instructing each of the plurality of other information processing devices to perform the processing with respect to the portion under responsibility by referring to other databases which are synchronized with the database and which are managed by the other information processing devices; result receiving means for receiving results of execution of the processing with respect to the portion under responsibility from the plurality of other information processing devices; and combining means for acquiring a result of execution of the processing with respect to the table by combining the results received by the result receiving means.

In addition, the information processing device may further include version determining means for determining a version of the table to be used in the processing, wherein the instructing means may instruct the plurality of other information processing devices to perform the processing using a version determined by the version determining means as the version to be used in the processing.

Furthermore, the information processing device may further include: update history creating means for, when a transaction including the query includes an update instruction related to the table, creating an update history of a case where the table is updated based on the update instruction; and update history notifying means for notifying the other information processing devices to which a portion under responsibility related to the update instruction has been allocated, of the update history.

In addition, the information processing device may further include update instruction identification information notifying means for, when a transaction including the query includes an update instruction related to the table, notifying the other information processing devices to which a portion under responsibility related to the update instruction has been allocated, of information which enables the update instruction to be identified.

Furthermore, the information processing device may further include: update instruction identification information notifying means for, when a transaction including the query includes an update instruction related to the table, notifying the other information processing devices to which a portion under responsibility related to the update instruction has been allocated, of information which enables the update instruction to be identified; and version determining means for, when a transaction including the query includes an update instruction related to the table, determining a version of the table updated by the update instruction as the version of the table to be used in the processing, wherein the instructing means may instruct the plurality of other information processing devices to perform the processing using a version determined by the version determining means as the version to be used in the processing.

In addition, the information processing device may further include: query accepting means for accepting the query from a user terminal; and responding means for returning a response to the query to the user terminal based on a result of execution of the processing with respect to the entire table obtained by the combination performed by the combining means.

Furthermore, the information processing device may further include: plan tree creating means for creating a plan tree in which nodes each representing individual processing included in the query are arranged in a tree shape in accordance with a sequence in which the nodes are to be processed; and object determining means for determining processing to be an object of the distributed execution based on an analysis result of the plan tree.

In addition, the information processing device may further include feasibility determining means for determining a feasibility of the distributed execution with respect to processing represented by each node included in the plan tree, wherein the object determining means may determine, as the object of the distributed execution process which is determined by the feasibility determining means to be distributed execution-feasible.

Furthermore, the information processing device may further include infeasible process excluding means for excluding processing determined by the feasibility determining means to be distributed execution-infeasible and processing connected at a higher level than this processing in the plan tree, from objects of the distributed execution.

In addition, the feasibility determining means may sequentially perform determinations from a lower-level node toward a higher-level node in the plan tree.

Furthermore, the information processing device may further include: suitability determining means for determining a suitability of the distributed execution with respect to processing represented by each node included in the plan tree; and unsuitable process excluding means for excluding processing determined by the suitability determining means to be unsuitable for the distributed execution and processing connected at a lower level than this processing in the plan tree, from objects of the distributed execution.

In addition, the suitability determining means may sequentially perform determinations from a higher-level node toward a lower-level node in the plan tree.

Furthermore, the present disclosure can also be comprehended as follows. Specifically, an information processing device according to the present disclosure includes: database managing means for managing a database synchronized with another database managed by another information processing device; instruction accepting means for accepting, from the other information processing device, an instruction to execute processing related to a query accepted by the other information processing device with respect to a portion under responsibility of the information processing device in a table used in the processing; process executing means for executing the processing with respect to the portion under responsibility by referring to the database managed by the database managing means; and result transmitting means for transmitting a result of execution of the processing with respect to the portion under responsibility to the other information processing device.

In addition, the information processing device may further include version acquiring means for acquiring a version of the table to be used in the processing from the other information processing device, wherein the process executing means may execute the processing based on the version of the table.

Furthermore, the information processing device may further include update history acquiring means for, when a transaction including the query includes an update instruction related to the table, acquiring an update history of a case where the table is updated based on the update instruction from the other information processing device, wherein the process executing means may perform the processing by referring to information in which the update history is reflected in the version of the table acquired by the version acquiring means.

In addition, the information processing device may further include: update instruction identification information acquiring means for, when a transaction including the query includes an update instruction related to the table, acquiring information which enables the update instruction to be identified from the other information processing device; and update content specifying means for specifying, based on the information which enables the update instruction to be identified, contents updated based on the update instruction, wherein the process executing means may perform the processing by further referring to the update contents specified by the update content specifying means.

Furthermore, the information processing device may further include version acquiring means for, when a transaction including the query includes an update instruction related to the table, acquiring a version of the table updated by the update instruction as the version of the table to be used in the processing, from the other information processing device, wherein the process executing means may execute the processing based on the version of the table.

Moreover, the present disclosure can also be comprehended as a computer system, an information processing device, a method executed by a computer, or a program which a computer is caused to execute. In addition, the present disclosure may be viewed as a recording of such a program on a recording medium that is readable by a device such as a computer, a machine, or the like. In this case, a recording medium that is readable by a computer or the like refers to a recording medium which stores information such as data and programs by an electric action, a magnetic action, an optical action, a mechanical action, or a chemical action and which can be read by a computer or the like.

The technique according to the present disclosure enables a processing load related to a single query to be distributed among a plurality of information processing devices.

DESCRIPTION OF EMBODIMENTS

Hereinafter, embodiments of a system, an information processing device, a method, and a program according to the present disclosure will be described with reference to the drawings. It should be noted that the embodiments described below merely represent exemplary embodiments and are not intended to limit a system, an information processing device, a method, and a program according to the present disclosure to the specific configurations described below. When implementing the present disclosure, a specific configuration may be adopted as appropriate in accordance with each embodiment. In addition, various improvements and modifications may be made to the present disclosure.

In the system according to the present disclosure, a plurality of information processing devices (nodes) are connected so as to be capable of communicating with each other. Each of the plurality of nodes is capable of accepting and executing a query. In addition, each of the plurality of nodes has a database which is managed by the node itself, and the databases are synchronized by a replication technique. As a replication technique for synchronizing databases, for example, a log-based replication technique which involves sequentially reflecting transaction logs may be adopted.

For example, execution of a JOIN syntax which uses a large table and a plurality of small tables is processing in which a processing load related to the large table is relatively heavy. Therefore, in the present disclosure, with respect to each of a plurality of portions included in the large table (the plurality of portions may be equal divisions of the table or divisions with different sizes), nodes responsible for processing are determined and the determined plurality of nodes are caused to perform distributed execution of the processing.

More specifically, by operating as a distributed execution instruction node which instructs distributed execution, a node accepting a query determines a division method, responsibilities, and the like of the query, notifies other nodes of contents of the query, a responsibility of each node, and the like, and instructs execution of processing with respect to a portion under responsibility. A node receiving the instruction executes the processing with respect to the portion under responsibility as an instruction execution node and transmits a result of the execution to the node having issued the instruction. The distributed execution instruction node receives the execution result transmitted from each instruction execution node having executed the distributed execution and aggregates the execution results.

First Embodiment

First, a first embodiment will be described. In the first embodiment, a case of performing distributed execution in consideration of an update during a transaction including a query which is an object of distributed execution will be described.

<<Configuration of System>>

Figure 1:
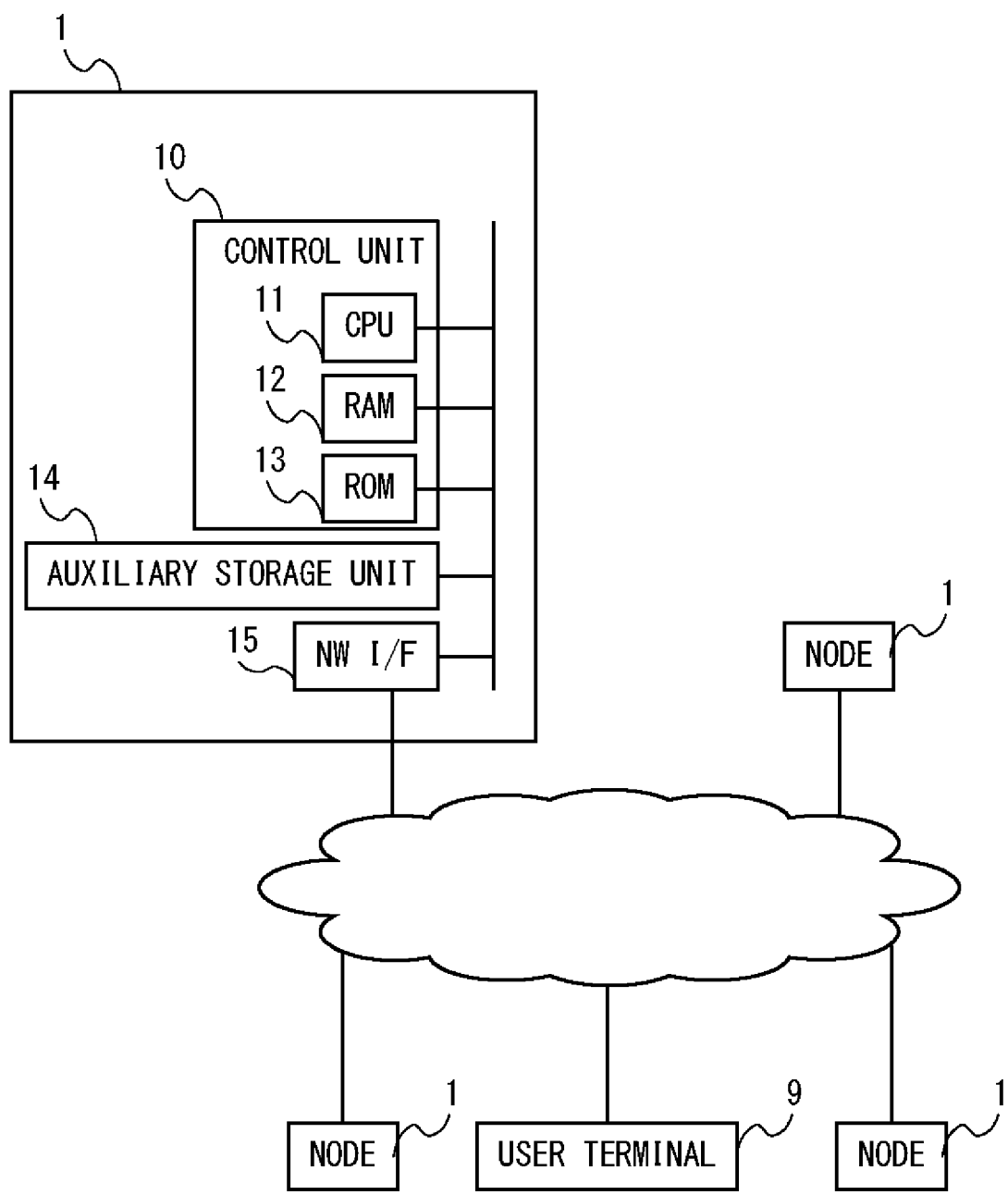
FIG. 1 is a diagram schematically showing a hardware configuration of a system according to an embodiment.

FIG. 1 is a diagram schematically showing a hardware configuration of a system according to the present embodiment. The system according to the present embodiment includes a plurality of nodes (information processing devices) 1 for responding to a search request (a query) from a user terminal 9. The plurality of nodes 1 are connected via a network so as to be capable of communicating with each other.

Each node 1 is a computer including a control unit 10 constituted by a CPU (Central Processing Unit) 11, a RAM (Random Access Memory) 12, a ROM (Read Only Memory) 13, and the like, an auxiliary storage device 14, and a communication interface 15. However, components in a specific hardware configuration of the node 1 can be omitted, replaced, or added as appropriate according to each embodiment. In addition, the node 1 is not limited to a single device. The node 1 may be realized by a plurality of devices using techniques related to so-called cloud computing, distributed computing, and the like.

In the present embodiment, a configuration will be described in which a node belonging to the system may act as both a distributed execution instruction node (a node which instructs distributed execution) and an instruction execution node (a node which receives an instruction to perform distributed execution and performs distributed execution of processing). Therefore, each node is equipped with a distributed execution instruction function for instructing distributed execution, a query analysis function for determining an object range of distributed processing, and an instruction execution function for receiving an instruction to perform distributed execution and executing processing.

However, a distributed execution instruction node and an instruction execution node may be determined in advance. In this case, a node which only becomes a distributed execution instruction node need not be equipped with the instruction execution function for performing distributed execution and a node which only becomes an instruction execution node need not be equipped with the distributed execution instruction function for giving instructions.

Moreover, in the present embodiment, a description such as "node 1" will be used when describing nodes in general without distinguishing between the nodes but a description such as "distributed execution instruction node 1" or "instruction execution node 1" will be used when describing nodes by distinguishing between the nodes. In addition, the system according to the present disclosure is applicable to database systems having a hierarchical structure as well as multi-master database systems. In this case, any node in the database systems may be made the distributed execution instruction node 1 or the instruction execution node 1 regardless of whether the node is a master node or a slave node.

Figure 2:
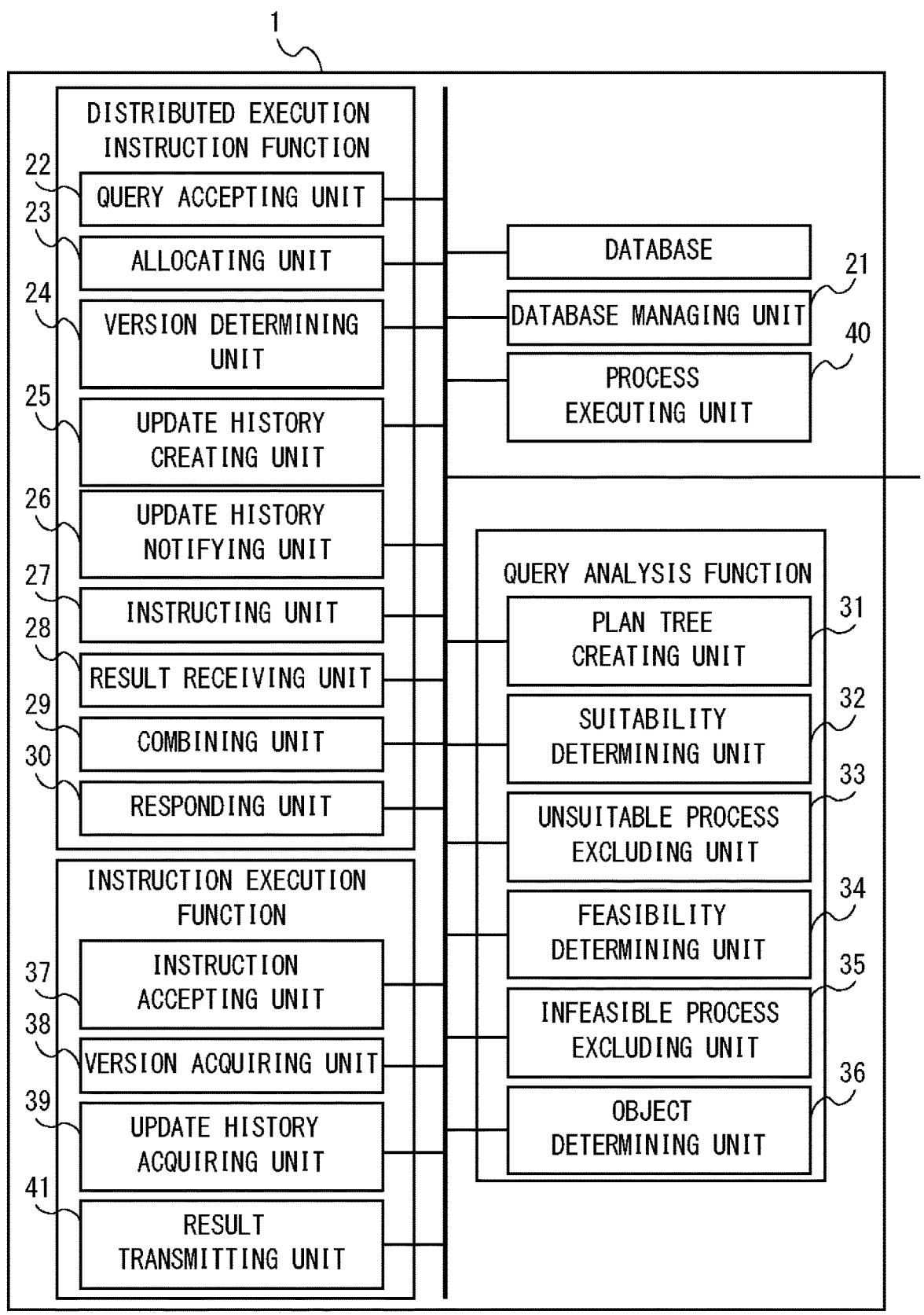
FIG. 2 is a diagram schematically showing a functional configuration of a node according to an embodiment.

FIG. 2 is a diagram schematically showing a functional configuration of the node 1 according to the present embodiment. By having the CPU 11 interpret and execute various programs deployed in the RAM 12 and control various hardware included in the node 1 according to the present embodiment, the node 1 functions as a computer including a database managing unit 21, a query accepting unit 22, an allocating unit 23, a version determining unit 24, an update history creating unit 25, an update history notifying unit 26, an instructing unit 27, a result receiving unit 28, a combining unit 29, a responding unit 30, a plan tree creating unit 31, a suitability determining unit 32, an unsuitable process excluding unit 33, a feasibility determining unit 34, an infeasible process excluding unit 35, an object determining unit 36, an instruction accepting unit 37, a version acquiring unit 38, an update history acquiring unit 39, a process executing unit 40, and a result transmitting unit 41.

Although an example in which the functions of the node 1 are executed by a general-purpose CPU 11 is explained in the present embodiment, a part of or all of these functions may be realized by one or a plurality of dedicated processors.

The database managing unit 21 manages a database. The database is synchronized with other databases managed by other nodes by the database managing unit 21. Specifically, the database managing unit 21 synchronizes a database managed by another node connected via a network and the database managed by the database managing unit 21 with each other using a replication technique.

The process executing unit 40 executes processing with respect to a portion under responsibility by referring to the database managed by the database managing unit 21. Moreover, when an instruction execution node receives an instruction issued by the distributed execution instruction node and executes processing, the process executing unit 40 of the instruction execution node performs the processing by referring to information in which update history is reflected on the version of the table acquired by the version acquiring unit 38 to be described later.

The distributed execution instruction function is realized by the query accepting unit 22, the allocating unit 23, the version determining unit 24, the update history creating unit 25, the update history notifying unit 26, the instructing unit 27, the result receiving unit 28, the combining unit 29, and the responding unit 30 to be described below.

The query accepting unit 22 accepts a query transmitted from a user terminal.

The allocating unit 23 allocates each of a plurality of portions included in a table used in processing related to a query with respect to a database as a portion under responsibility of each of a plurality of instruction execution nodes. Specifically, the allocating unit 23 selects a plurality of nodes to be instructed to perform distributed execution from the nodes belonging to the system. In addition, the allocating unit 23 determines a portion of the table to be an object of divided read for which a selected node is to be held responsible. Alternatively, the number of divisions of the table may be determined and nodes corresponding to the number of divisions of the table maybe selected in advance.

The version determining unit 24 determines a version of the table to be used in processing in order to ensure that discrepancies do not occur in data to be an object of processing between instruction execution nodes. In this case, the version represents information for specifying contents and a state of a database at a certain time point.

The update history creating unit 25 creates, when a transaction including a query includes an update instruction related to a table, an update history of a case where the table is updated based on the update instruction. The update history creating unit 25 creates, as an update history, information in which information enabling an updated record in the table to be identified and specific contents of the update are associated with each other.

The update history notifying unit 26 notifies an instruction execution node to which a portion under responsibility related to an update instruction has been allocated, of the update history.

In the present embodiment, when a node performing distributed execution is updated, the update history creating unit 25 creates an update history and the update history notifying unit 26 transmits the update history to the instruction execution node in order to cause the instruction execution node performing distributed processing to perform processing by combining a table managed by the other node and the update history. Therefore, a mechanism according to the present disclosure can be applied in accordance with contents of an update related to an update instruction issued during execution of the transaction to both a database system in which an entity of a database is changed before the transaction is committed and a database system in which the entity of a database is changed after the transaction is committed.

For example, let us assume a case where a transaction being executed by the distributed execution instruction node includes an update instruction (INSERT, DELETE, or the like) of a table B as well as a JOIN syntax of a table A and the table B.

In this case, with a database system in which the entity of the database is changed after a transaction is committed, for example, "information indicating how the table B was updated by the distributed execution instruction node" only exists on a memory of the distributed execution instruction node and is not shared by an instruction execution node to perform distributed execution. In consideration thereof, in the present embodiment, when transmitting an instruction for distributed execution, an update history related to the update instruction is transmitted together with version information of a table. In other words, in the present embodiment, the distributed execution instruction node preferentially transmits an update history related to a query that is an object of distributed processing to the instruction execution node to perform the distributed processing. The instruction execution node executes a query for which the instruction execution node is responsible based on data obtained by combining a table main body indicated in the version information with the update history. Processing performed by the instruction execution node will be described later as processing performed by the update history acquiring unit 39 and the process executing unit 40.

On the other hand, with a database system in which the entity of the database is changed before a transaction is committed, since update information of the transaction is already reflected in the instruction execution node by the time the instruction execution node executes the processing, the processing described above is not essential. However, even in such a database system, the processing according to the present embodiment may be adopted. When the processing according to the present embodiment is adopted, even if a situation arises where the entity of the database cannot be changed in time before the execution of the processing by an instruction execution node, a query can be processed without incident.

The instructing unit 27 causes a plurality of instruction execution nodes to perform distributed execution of processing by instructing each of the plurality of instruction execution nodes to perform the processing with respect to a portion under responsibility. At this point, the instructing unit 27 instructs each instruction execution node to perform the processing by referring to a database managed by each instruction execution node. In this case, as described earlier, the database managed by each instruction execution node is synchronized with a database of the distributed execution instruction node. In addition, the instructing unit 27 instructs the plurality of instruction execution nodes to perform the processing using a version determined by the version determining unit 24 as the version to be used in the processing.

The result receiving unit 28 receives a result of execution of the processing with respect to a portion under responsibility from the plurality of instruction execution nodes.

The combining unit 29 acquires a result of execution of the processing with respect to a table by combining the results received by the result receiving unit 28.

The responding unit 30 returns a response to the query to the user terminal based on a result of execution of the processing with respect to the entire table obtained by the combination performed by the combining unit 29.

The query analysis function is realized by the plan tree creating unit 31, the suitability determining unit 32, the unsuitable process excluding unit 33, the feasibility determining unit 34, the infeasible process excluding unit 35, and the object determining unit 36 to be described below.

The plan tree creating unit 31 creates a plan tree. In this case, a plan tree means a tree-shaped arrangement of plan nodes (the term "plan node" will be used in order to avoid confusion with nodes representing information processing devices) which represent each of the individual processing included in a query in a sequence in which the processing is to be performed.

The suitability determining unit 32 determines, with respect to the processing represented by each plan node included in the plan tree, a suitability of distributed execution based on a load generated by the processing. Specifically, the suitability determining unit 32 predicts a load generated when a distributed execution of the processing indicated in the plan node is performed and, when the load is predicted to equal or exceed a prescribed load, determines that the plan node related to the processing is unsuitable for performing the distributed execution. In doing so, the suitability determining unit 32 sequentially performs determinations from a higher-level plan node toward a lower-level plan node in the plan tree.

The unsuitable process excluding unit 33 excludes processing determined by the suitability determining unit 32 to be unsuitable for the distributed execution and processing connected at a lower level than this processing in the plan tree, from objects of the distributed execution.

The feasibility determining unit 34 determines a feasibility of the distributed execution with respect to processing represented by each plan node included in the plan tree based on contents of the processing. Specifically, the feasibility determining unit 34 determines the feasibility of the distributed execution by determining whether or not contents of the processing indicated in the plan node are contents of processing which are distributed execution-feasible in the system. In this case, "a feasibility of distributed execution" represents a feasibility indicating whether or not the distributed execution can be performed by the system based on functions and contents of settings of the system. Therefore, even when contents (for example, an AVERAGE syntax) of processing indicated by plan nodes are the same, distributed execution-feasible processing and distributed execution-infeasible process may differ depending on the system. In this case, the feasibility determining unit 34 sequentially performs determinations from a lower-level plan node toward a higher-level plan node in the plan tree.

The infeasible process excluding unit 35 excludes processing determined by the feasibility determining unit 34 to be distributed execution-infeasible and processing connected at a higher level than this processing in the plan tree, from objects of the distributed execution.

The object determining unit 36 determines processing to be an object of distributed execution in accordance with an analysis result of the plan tree. In the present embodiment, the object determining unit 36 determines processing determined as distributed execution-feasible by the feasibility determining unit 34 as an object of distributed execution.

The instruction execution function is realized by the instruction accepting unit 37, the version acquiring unit 38, the update history acquiring unit 39, and the result transmitting unit 41 to be described below.

The instruction accepting unit 37 accepts, from the distributed execution instruction node, an execution instruction of processing related to a query accepted by the distributed execution instruction node with respect to a portion under responsibility of the information processing device in a table used in the processing.

The version acquiring unit 38 acquires, from the distributed execution instruction node, a version of the table to be used in the processing that is an object of distributed execution.

The update history acquiring unit 39 acquires, when a transaction including a query includes an update instruction related to a table, an update history of a case where the table is updated based on the update instruction from the distributed execution instruction node.

The result transmitting unit 41 transmits a result of execution of the processing with respect to a portion under responsibility to the distributed execution instruction node.

As described earlier, in the first embodiment, an embodiment is described which takes into consideration an update during execution of a transaction including a query which is an object of distributed execution. However, in an embodiment which does not take into consideration an update of a database during execution of a transaction related to a query that is an object of distributed execution when executing the query or, in other words, an embodiment which ignores contents of an update due to a transaction including the query during distributed execution, the update history creating unit 25, the update history notifying unit 26, and the update history acquiring unit 39 may be omitted.

<<Flow of Processing>>

Next, details of processing according to the present embodiment will be described. Moreover, specific contents, a sequence, and the like of processing described in the present embodiment merely represent one example of implementing the present disclosure. Specific contents, sequences, and the like of the processing may be appropriately selected in accordance with embodiments.

Figure 3:
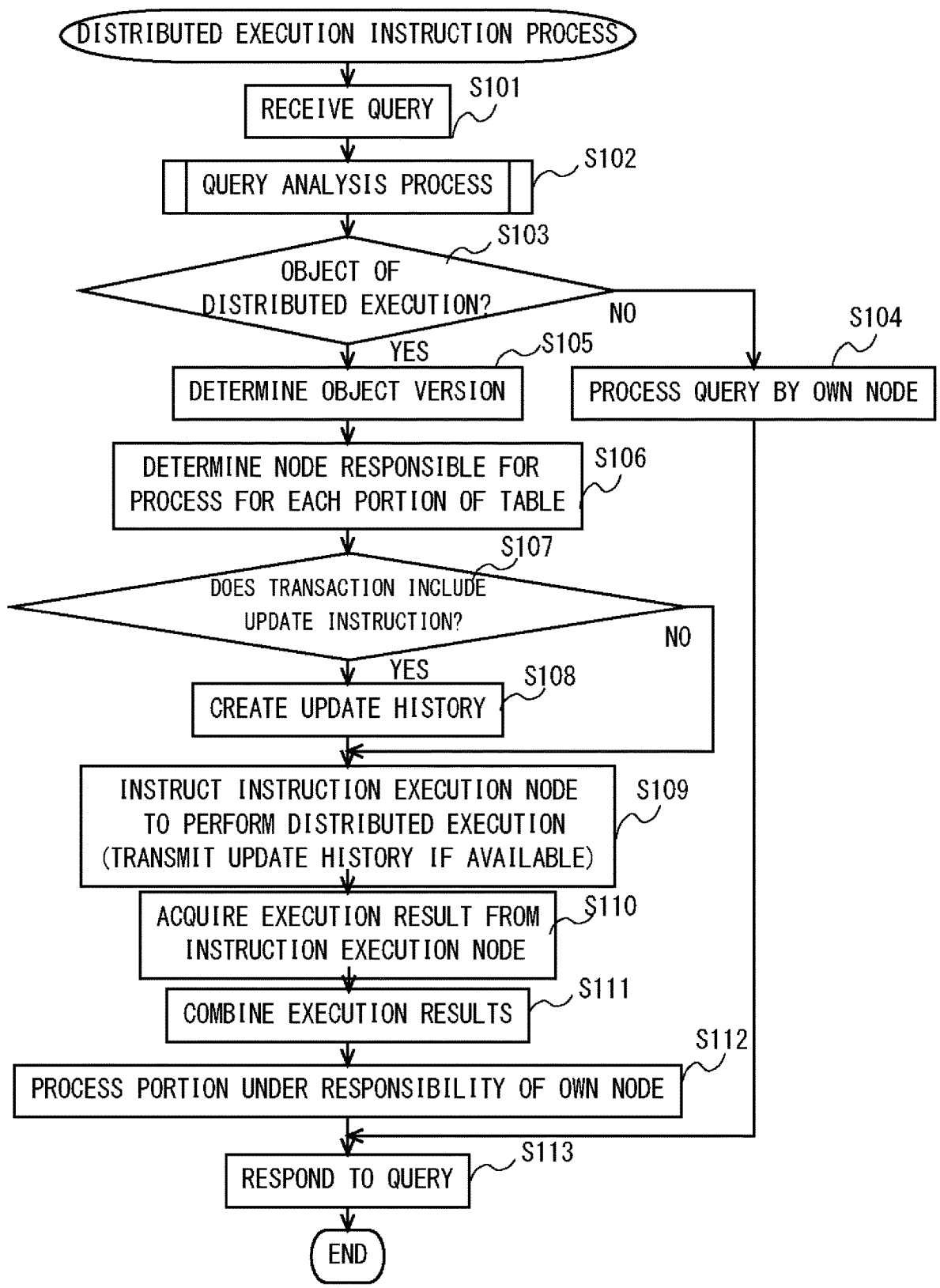
FIG. 3 is a flow chart showing a flow of distributed execution instruction process that is executed by a node in an embodiment.

FIG. 3 is a flow chart showing a flow of distributed execution instruction process that is executed by the node 1 in the present embodiment. The processing shown in the present flow chart is started with the acceptance of a query by the node 1 as a trigger.

In steps S101 to S103, a query is received and a determination is made as to whether or not the query is to be an object of distributed execution. The query accepting unit 22 accepts a query transmitted from the user terminal 9 (step S101). The accepted query is analyzed by the query analysis function (the plan tree creating unit 31, the suitability determining unit 32, the unsuitable process excluding unit 33, the feasibility determining unit 34, the infeasible process excluding unit 35, and the object determining unit 36) included in a receiving node (step S102).

Moreover, in query analysis process (step S102) by the query analysis function, contents of processing related to the query are analyzed and a range of distributed execution is determined. Specifically, the query analysis function creates and analyzes a plan tree and determines processing to be an object of distributed execution in accordance with an analysis result of the plan tree. A specific example of the query analysis process will be described later with reference to the flow chart shown in FIG. 5.

The node having received the query determines whether the accepted query is to be processed by the node itself or distributed execution of the accepted query is to be performed by another node in accordance with a result of the query analysis process (step S103). When even a part of the processing related to the query becomes an object of distributed execution as a result of the query analysis, the processing advances to step S105 and the node having received the query thereafter operates as the distributed execution instruction node. On the other hand, when none of the portions of the processing related to the query are to be an object of distributed execution as a result of the query analysis, the processing advances to step S104.

In step S104, the processing related to the query is executed by the node itself having accepted the query from the user terminal 9. The process executing unit 40 refers to the database managed by the database managing unit 21 of the node having accepted the query in accordance with the plan tree created in step S102 and executes processing related to the query with respect to the database. In other words, distributed execution is not performed in this case. Subsequently, the processing proceeds to step S113.

In step S105, a version used in the processing is determined. The version determining unit 24 determines the version of the table to be used in the processing. Subsequently, the processing proceeds to step S106.

In step S106, a division method of the table used in the processing and a node to be responsible of each divided portion are determined. The allocating unit 23 allocates each of a plurality of portions included in the table used in the processing related to the query as a portion under responsibility of each of a plurality of instruction execution nodes. For example, the allocating unit 23 selects a plurality of (for example, 5) nodes as instruction execution nodes from the nodes belonging to the system. The selection may be performed by referring to a current operational state and the like of each node so that nodes with smaller loads are selected. Once the nodes are selected, the allocating unit 23 determines which node among the plurality of selected nodes is to be responsible for which portion of the table. In this case, the table may be equally divided by the number of nodes (for example, divided into 5 equal portions) or may be divided in accordance with processing capabilities of the nodes. Subsequently, the processing proceeds to step S107.

Moreover, when the processing to be an object of the distributed processing is JOIN of a plurality of tables, in step S106, a table to be an object of division is determined among the plurality of tables and the determined table is divided. For example, when there is one relatively large table and the other tables are relatively small, normally, the largest table is made a division object.

However, the table to be the object of division may not be limited to one table. For example, in a case where there are a plurality of large tables and a sufficient number of instruction execution nodes can be secured, by making a plurality of tables division objects and allocating a combination of divided portions of different tables to each instruction execution node, a plurality of tables related to a JOIN instruction can be made objects of a divided read. Specifically, for example, when a table X is divided into x-number of portions and a table Y is divided into y-number of portions, x*y-number of combinations of a divided portion of the table X and a divided portion of the table Y are created. Therefore, by determining an instruction execution node to be responsible for each of the x*y-number of combinations, two tables can be made objects of a divided read in the distributed processing of a JOIN instruction. A similar method can be used to make three or more tables objects of a divided read.

In steps S107 and S108, when a transaction related to the received query includes an update instruction of the database managed by the node, an update history of a case of applying the update is created. The update history creating unit 25 determines whether or not the transaction including the query includes an update instruction related to a table (step S107), and when the transaction includes an update instruction, creates an update history of a case where the table is updated based on the update instruction (step S108). A specific method of creating an update history is as described earlier in the description of the update history creating unit 25. Subsequently, the processing proceeds to step S109.

In step S109, instructions to instruction execution nodes are transmitted. The instructing unit 27 instructs the plurality of instruction execution nodes selected in step S106 to perform the processing with respect to portions of responsibility by referring to databases managed by the respective instruction execution nodes (these databases are synchronized with each other), and thereby causes the plurality of instruction execution nodes to perform distributed execution of the processing. In doing so, the instructing unit 27 notifies each instruction execution node of contents of the query that is the object of the distributed processing and further instructs the instruction execution node to perform the processing using the version determined by the version determining unit 24 as the version to be used in the processing. At this point, in a case where a log-based replication technique is adopted by a system according to an embodiment, the instructing unit 27 notifies a log sequence number (LSN) corresponding to the determined version so that a transaction log corresponding to the specified version can be specified.

In addition, when an update history is created in step S108 described above, the update history notifying unit 26 notifies an instruction execution node to which a portion under responsibility related to an update instruction has been allocated, of the update history. Subsequently, the processing proceeds to step S110.

Once the instructions in step S109 are performed, the plurality of nodes having received the instructions operate as instruction execution nodes and execute the processing related to the query with respect to each portion under responsibility in accordance with instructions from the distributed execution instruction node.

Figure 4:
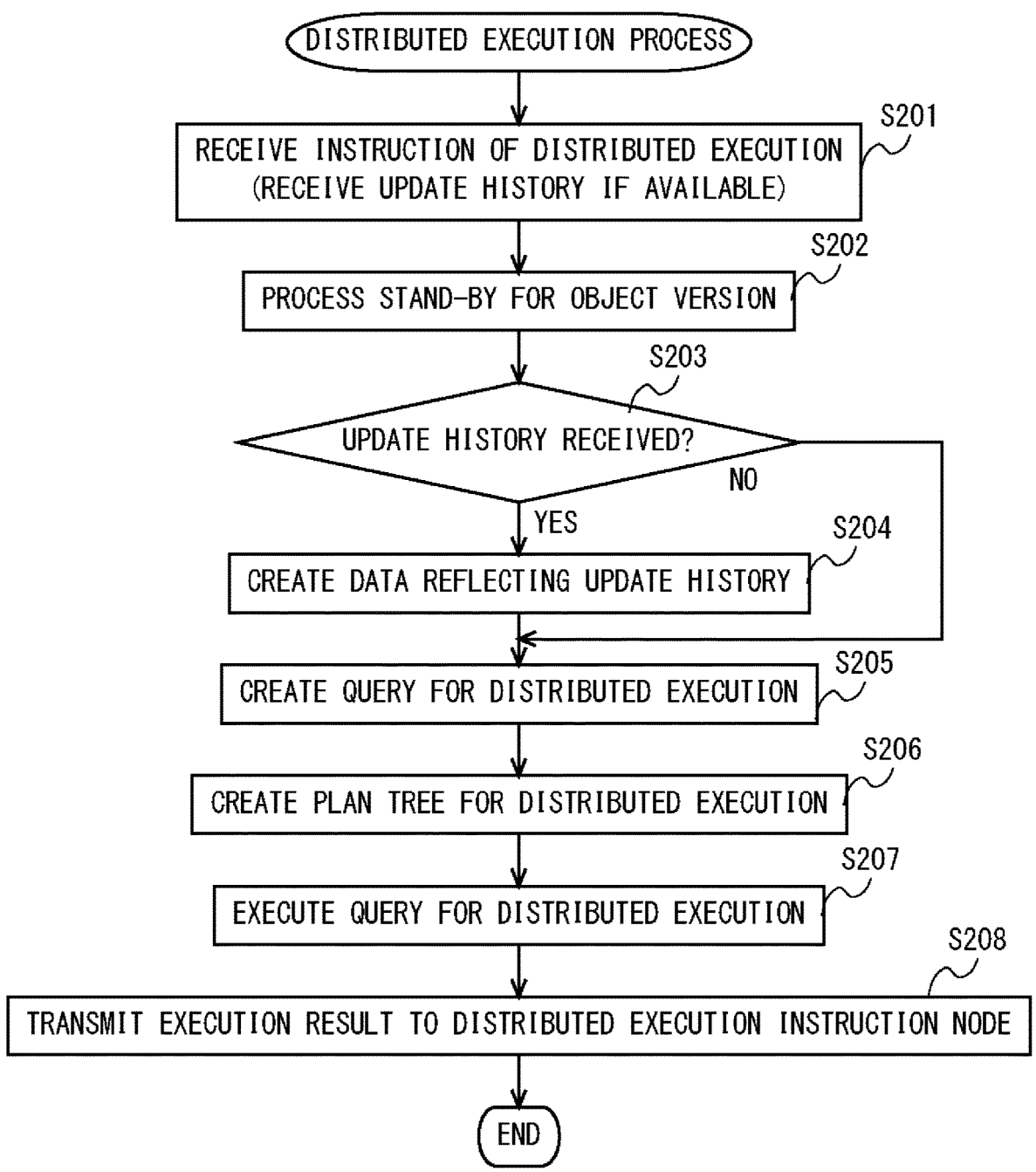
FIG. 4 is a flow chart showing a flow of distributed execution process that is executed by a node in an embodiment.

FIG. 4 is a flow chart showing a flow of distributed execution process that is executed by the node 1 in the present embodiment. The processing shown in the present flow chart is started with the acceptance of an instruction for distributed execution transmitted from the distributed execution instruction node (refer to step S109 in FIG. 3) by the node 1 as a trigger. In other words, the present flow chart represents a flow chart in a case where a node operates as an instruction execution node.

In step S201, an instruction for distributed execution transmitted from the distributed execution instruction node is accepted. Specifically, the instruction accepting unit 37 accepts, from the distributed execution instruction node, an execution instruction of processing related to a query accepted by the distributed execution instruction node with respect to a portion under responsibility (a portion under responsibility in a table used in the processing) of the node. In addition, the version acquiring unit 38 acquires a version of the table to be used in the processing from the distributed execution instruction node.

As described above, when a transaction including a query includes an update instruction related to a table, an update history in a case where the update is applied is created and an instruction execution node to which a portion under responsibility related to the update instruction has been allocated is notified of the created update history (refer to steps S108 and S109). Therefore, when a transaction including a query includes an update instruction related to a table, the update history acquiring unit 39 acquires an update history of a case where the table is updated based on the update instruction from the distributed execution instruction node. Subsequently, the processing proceeds to step S202.

In step S202, stand-by processing is performed until the specified version of the table becomes available. Specifically, the instruction execution node stands by until it is confirmed that the version of the table acquired by the version acquiring unit 38 in step S201 is present in the instruction execution node. For example, in a case where a log-based replication technique is adopted by a system according to an embodiment, the instruction execution node may stand by until a transaction log corresponding to the specified version is reflected. In this case, whether or not a transaction log is reflected can be determined by, for example, referring to a log sequence number (LSN) notified from the distributed execution instruction node. Subsequently, the processing proceeds to step S203.

In steps S203 and S204, when an update history has been acquired, information reflecting the update history is created. Each instruction execution node determines whether or not an update history has been acquired by the update history acquiring unit 39 in step S201 (step S203), and when the update history has been acquired, creates information in which the update history acquired from the distributed execution instruction node is reflected in the version of the table acquired by the version acquiring unit 38 (step S204). More specifically, the instruction execution node reads records in the database one row at a time, makes a record in the database a search object for rows in which the update history is not present among the read rows and makes a row of the update history a search object instead of a record in the database for rows in which the update history is present among the read rows. However, data obtained at this point is only used to conduct a search and an actual update of the record is performed at a timing determined by a replication function included in the database (for example, a synchronized commit timing). In other words, the instruction execution node need not update its own database in distributed processing. On the other hand, when an update history is not acquired, the processing indicated in step S204 is omitted. Subsequently, the processing proceeds to step S205.

In step S205, a query for distributed execution to be executed in accordance with a range of responsibility is created. First, the instruction execution node having received an instruction for distributed execution creates, based on the received query, a query for distributed execution which is customized so that the processing with respect to the portion under responsibility of the instruction execution node itself can be executed. Specifically, in a case where, for example, a search object of an original query is an entire table but a range of responsibility of the instruction execution node is a part of the table, a query for distributed execution specifying a block of the table for which the instruction execution node is responsible is created based on the original query. Moreover, while the present embodiment adopts a configuration in which each instruction execution node creates a query for distributed execution to be executed by the instruction execution node itself, the distributed execution instruction node may create a query for distributed execution to be executed by each instruction execution node in advance and notify an instruction execution node of the query for distributed execution by including the same in an instruction. Subsequently, the processing proceeds to step S206.

In step S206, a plan tree for distributed execution is created. The plan tree creating unit 31 creates a plan tree for distributed execution in which plan nodes representing each of the instructions included in a query for distributed execution are arranged in a tree shape in a sequence in which the instructions are to be executed.

In step S207, the created query for distributed execution is executed. The process executing unit 40 executes the query for distributed execution according to the plan tree for distributed execution created in step S206. Accordingly, the processing with respect to the portion under responsibility is executed by referring to the database managed by the database managing unit 21. In doing so, the process executing unit 40 performs the processing by referring to information created in step S204 in which update history is reflected on the version of the table acquired by the version acquiring unit 38. Subsequently, the processing proceeds to step S208.

In step S208, a result of execution of the query for distributed execution is transmitted. The result transmitting unit 41 transmits the result of execution of the processing with respect to the portion under responsibility to the distributed execution instruction node which is the transmission source of the instruction received in step S201. Subsequently, the processing indicated in the flow chart shown in FIG. 3 is finished.

Moreover, while the present embodiment describes an example in which an instruction execution node creates a query for distributed execution for executing processing with respect to a portion under responsibility of the instruction execution node itself and executes the distributed processing to facilitate understanding of the present disclosure, the distributed execution by each instruction execution node need not rely on a query for distributed execution as described in the present embodiment. For example, by accepting all or a part of the plan tree created by the distributed execution instruction node in step S102, an instruction execution node can create a plan tree for distributed execution specifying a block in a table or the like for which the instruction execution node is responsible based on the accepted plan tree without having to create a query for distributed execution. The instruction execution node can directly execute a syntax of a node for which the instruction execution node itself is responsible among nodes on the plan tree to be described later with respect to its own portion under responsibility in the table.

Next, returning to FIG. 3, a description of processing by the distributed execution instruction node will be continued.

In steps S110 and S111, a result of execution of the processing transmitted from an instruction execution node having received an instruction for distributed execution is received and aggregated. The result receiving unit 28 receives a result of execution of the processing with respect to a portion under responsibility from a plurality of instruction execution nodes (step S110). Subsequently, by combining the results received by the result receiving unit 28 from the plurality of instruction execution nodes and a result of execution by the distributed execution instruction node itself in step S110, the combining unit 29 acquires a result of execution of the processing with respect to a table (step S111). Subsequently, the processing proceeds to step S112.

In step S112, the processing for which the node itself having accepted the query from the user terminal 9 is responsible is executed. The process executing unit 40 refers to the database managed by the database managing unit 21 of the node having accepted the query in accordance with the plan tree created in step S102 and executes processing determined to be outside of a range of distributed execution among the processing related to a query with respect to the database. In doing so, the process executing unit 40 uses the result of the distributed execution obtained in step S111 when necessary. Subsequently, the processing proceeds to step S113.

In step S113, the result of execution of the query obtained in the processing in steps S110 to S112 or the result of execution of the query obtained by being executed by the node having accepted the query itself in step S104 is transmitted to the user terminal. When the result of execution of the query is obtained in the processing in steps S110 to S112, the responding unit 30 returns a response to the query to the user terminal based on the result of execution of the processing with respect to the entire table obtained by the combination performed by the combining unit 29. On the other hand, when the result of execution of the query is obtained in step S104, the responding unit 30 returns this execution result to the user terminal. Subsequently, the processing indicated in the flow chart shown in FIG. 4 is finished.

With the system according to the present embodiment, by causing distributed execution instruction process and distributed execution process described above with reference to FIGS. 3 and 4 to be processed by, among a plurality of nodes belonging to the system, a node having received a query (the distributed execution instruction node) and a node having accepted a distributed execution instruction (an instruction execution node), a distributed execution of the query is realized and processing load related to a single query can be distributed among a plurality of information processing devices.

In addition, according to the technique described in the present disclosure, since a plurality of nodes respectively manage databases synchronized with each other, a determination whether or not to perform distributed execution or not and a determination of responsibilities when performing the distributed execution can be made freely. Furthermore, according to the technique described in the present disclosure, for example, processing when executing syntaxes such as the JOIN syntax described earlier can also be distributed. Moreover, modes of division (the number of divisions, sizes of divided portions, and the like) can also be changed as appropriate in accordance with a load on each node.

Next, a flow of query analysis process for determining a range of distributed execution will be described. However, the query analysis process described in the present embodiment is an example of processing for determining a range of distributed execution. Other algorithms may be adopted for the processing for determining a range of distributed execution.

Figure 5:
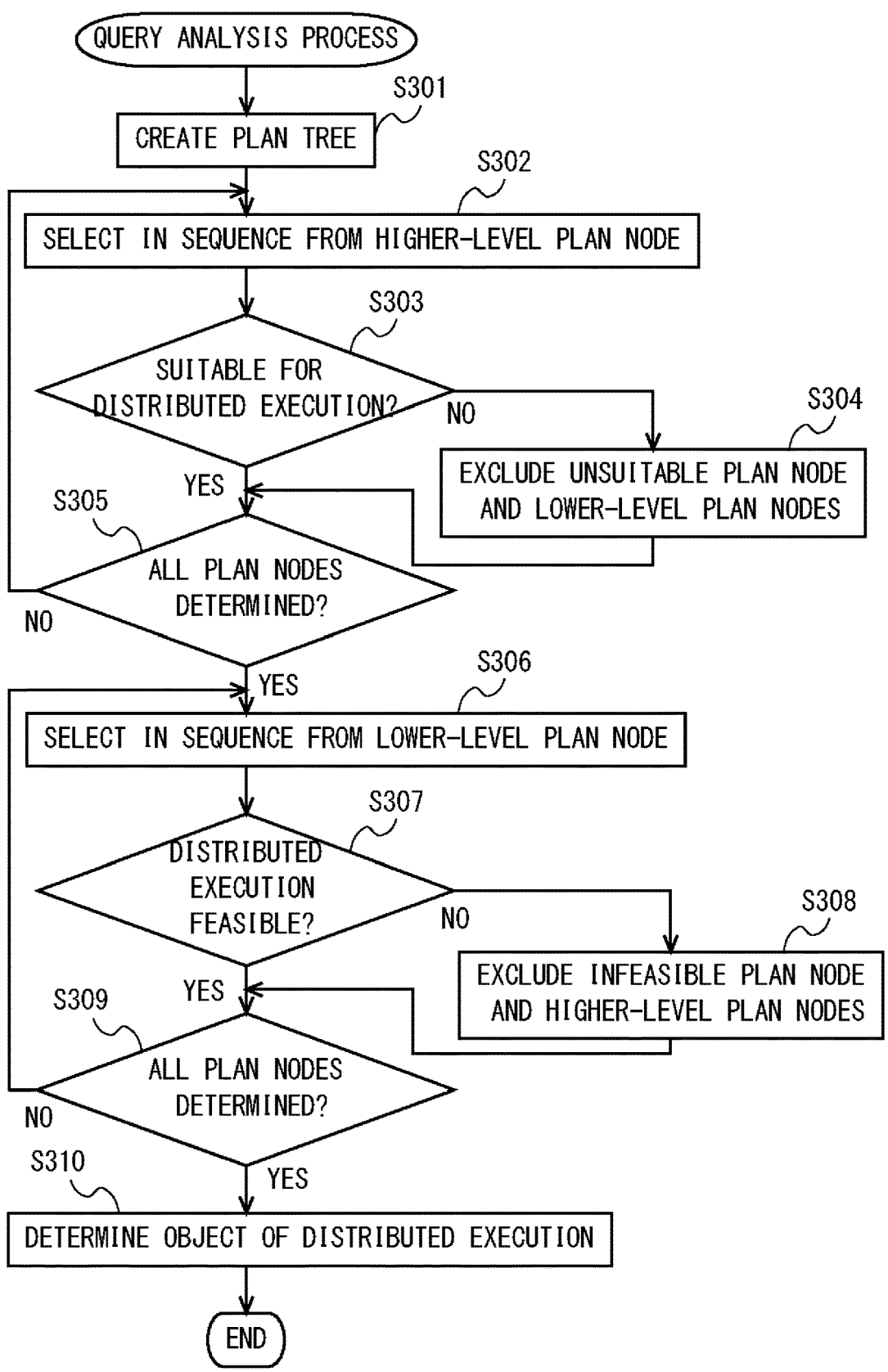
FIG. 5 is a flow chart showing a flow of query analysis process that is executed by a node in an embodiment.

FIG. 5 is a flow chart showing a flow of query analysis process that is executed by the node 1 in the present embodiment. The processing indicated by the present flow chart corresponds to the processing of step S102 in the distributed execution instruction process shown in FIG. 3.

In step S301, a plan tree is created. The plan tree creating unit 31 creates a plan tree in which plan nodes representing each of the instructions included in a query are arranged in a tree shape in a sequence in which the instructions are to be executed.

Figure 6:
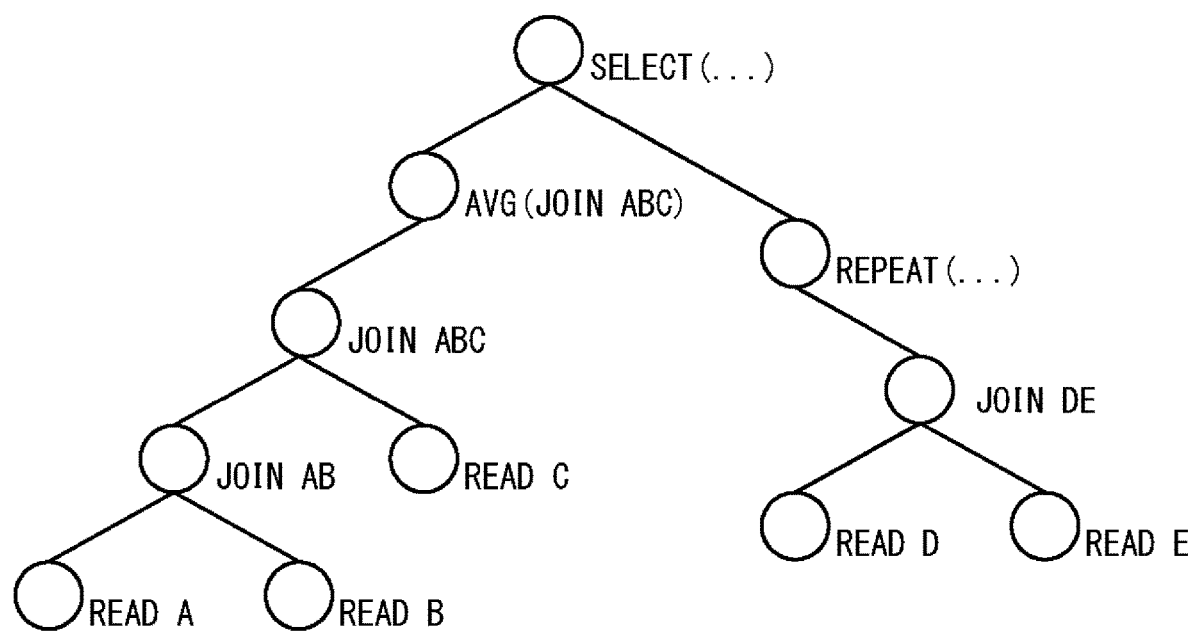
FIG. 6 is a diagram illustrating a plan tree created in an embodiment.

FIG. 6 is a diagram illustrating a plan tree created in the present embodiment. When performing the distributed execution according to the present disclosure, a plan tree is created and analyzed to determine which of the instructions included in a query is to be an object of the distributed execution. In the analysis, a range to be an object of distributed execution is determined by determining whether or not the distributed execution is suitable or feasible from a root to a terminal and from a terminal to a root of the tree.

Each plan node of the created plan tree represents each instruction (syntax) included in a query. The plan tree represents a flow in which the query is processed by repetitions of a cycle in which: execution is started from an instruction indicated in a leaf (in other words, a bottommost plan node) of the tree; when execution of the instruction is completed, a result of the execution is handed over to a higher-level plan node (a parent plan node); and an instruction indicated in the plan node having received the execution result is executed. Once the plan tree is created, the processing proceeds to step S302.

In steps S302 to S305, a determination on whether or not plan nodes on the plan tree are suitable for distributed execution is made. The suitability determining unit 32 determines suitability of distributed execution with respect to an instruction represented by each plan node included in the plan tree (step S303). Subsequently, the unsuitable process excluding unit 33 excludes an instruction determined by the suitability determining unit 32 to be unsuitable for the distributed execution and instructions connected at a lower level than this instruction in the plan tree, from objects of the distributed execution (step S304).

In the plan tree shown in FIG. 6, a REPEAT syntax and the like are present in a query. In this case, when an instruction of distributed execution for executing a REPEAT syntax and acquisition of a result of the execution are performed a plurality of times via a network, there is a possibility that the network used by communication from the instruction execution node to the distributed execution instruction node may become saturated. In addition, when the REPEAT syntax is structured to recursively use a result of an earlier instruction, the processing may become complicated such as the distributed execution instruction node having obtained an execution result having to repetitively instruct a value based on the execution result to the instruction execution node every time the processing is performed. Therefore, the suitability determining unit 32 determines that an instruction of a plan node related to the REPEAT syntax is an instruction unsuitable for distributed execution and the unsuitable process excluding unit 33 excludes instructions related to the plan node and lower-level plan nodes thereof from objects of the distributed execution.

In the processing described above, since an instruction determined to be unsuitable for distributed execution and lower-level instructions thereof are excluded from objects of the distributed execution, determinations are efficiently made in sequence from a higher-level plan node in the plan tree. Therefore, the suitability determining unit 32 sequentially performs determinations from a higher-level plan node toward a lower-level plan node in the plan tree (step S302). Once a determination or an exclusion is completed for all of the plan nodes (step S305), the processing advances to step S306. Moreover, an instruction unsuitable for distributed execution is not necessarily a distributed execution-infeasible instruction. Therefore, the processing indicated in steps S302 to S305 may be omitted.

In steps S306 to S309, a determination is made on whether or not distributed execution can be performed for the plan nodes on the plan tree. The feasibility determining unit 34 determines a feasibility of distributed execution with respect to an instruction represented by a plan node not excluded in step S304 among the respective plan nodes included in the plan tree (step S307). In the present embodiment, the feasibility determining unit 34 determines distributed execution feasibility of an instruction related to a plan node by a method described below. Specifically, when
(1) the instruction indicated in a plan node is included in a list prepared in advance, and
(2) an instruction execution node is to possess information such as a table necessary for executing the instruction by the time of execution of the instruction,
the feasibility determining unit 34 determines that the instruction indicated in the plan node is a distributed execution-feasible instruction.

Condition (1) is for confirming that the instruction related to the plan node itself corresponds to a distributed execution-feasible instruction type, and the distributed execution instruction node possesses a list of distributed execution-feasible instruction (syntax) types in advance. In the present embodiment, for example, a READ instruction and a JOIN instruction are stored in the list as distributed execution-feasible instruction types. However, instruction types that are distributed execution-feasible/distributed execution-infeasible are not limited to the examples described in the present embodiment and are determined based on a distributed execution function and contents of settings of a system according to an embodiment.

Condition (2) is for determining whether or not an instruction execution node executing a plan node possesses information such as a table necessary for executing an instruction since distributed execution cannot be performed when the instruction execution node does not possess the information even if the plan node satisfies condition (1) described above. For example, when an instruction indicated by a plan node that is a determination object can be executed by only referring to "a portion obtained as a result of processing by the instruction execution node when processing a lower-level plan node of the plan node" and/or "a table managed by the instruction execution node executing the plan node", since condition (2) is satisfied, the node having been instructed to perform distributed execution is considered capable of comprehending all information necessary to perform the specified distributed execution. Examples of "a portion obtained as a result of processing by the instruction execution node when processing a lower-level plan node of the plan node" includes, when the plan node is a plan node of a JOIN instruction, a portion of a table read in processing of a lower-level READ instruction plan node by the instruction execution node and a result of processing obtained in processing of a lower-level JOIN instruction plan node by the instruction execution node. On the other hand, distributed execution of an instruction of a plan node which requires information not possessed by an instruction execution node such as information obtained from a result of execution of an instruction by another node cannot be performed. In addition, since the instruction execution node is also unable to possess a result of execution of a distributed execution-infeasible plan node, higher-level plan nodes of the distributed execution-infeasible plan node are also distributed execution-infeasible.

The READ instruction shown in FIG. 6 will be contemplated. When an instruction indicated by a plan node that is a determination object is a READ instruction, since the READ instruction is stored in the list as described earlier and the table in the data is replicated to all nodes, the plan node of the READ instruction satisfies both conditions (1) and (2) described above and the plan node is determined to be distributed execution-feasible. In other words, all of the bottommost READ instruction plan nodes are distributed execution-feasible. In the example shown in FIG. 6, it is determined that the plan nodes indicating READ processing of tables A, B, and C are distributed execution-feasible. Moreover, the plan nodes indicating READ processing of tables D and E are subordinate to the plan node determined as unsuitable for distributed execution in the processing of steps S302 to S305 and are already excluded from objects of determination of distributed execution feasibility by the feasibility determining unit 34.

Next, the JOIN instruction shown in FIG. 6 will be contemplated. As described earlier, since a JOIN instruction is stored in the list as a distributed execution-feasible instruction type, condition (1) is satisfied. In this case, in higher-level plan nodes, there is a possibility that each instruction execution node only possesses information of a portion read by the instruction execution node itself by being responsible for a divided read. This is because there is a possibility that a distributed execution-feasible lower-level READ instruction plan node may divide and read the table. However, even when a divided read of the table is performed at a lower-level READ instruction plan node, condition (2) can be satisfied by adopting a portion read by each instruction execution node during the divided read as an object portion of JOIN processing to be performed by the instruction execution node.

Moreover, while the plan nodes indicating READ processing of tables A, B, and C are determined as distributed execution-feasible in the example shown in FIG. 6, as described earlier with reference to step S106, a plurality of tables can be made divided read objects at a lower-level plan node of a JOIN instruction plan node. However, in the present embodiment, when a determination that READ processing is distributed execution-feasible is made with respect to a plurality of tables, only a largest table (a table with a largest load due to the READ processing) is made an object of divided read.

Meanwhile, for example, when a plan node (AVERAGE syntax) for calculating an average value of a table joined by execution of a JOIN syntax is present in the middle of the plan tree, since nodes (instruction execution nodes) other than the distributed execution instruction node do not possess all of the results obtained by the execution of the JOIN syntax, condition (2) is not satisfied and the system according to the present embodiment determines that the plan node is not distributed execution-feasible (refer to step S307). Therefore, in the present embodiment, this plan node is executed by the distributed execution instruction node itself. Moreover, in the present embodiment, an AVERAGE instruction is not stored in the list described above and the plan node also does not satisfy condition (1). However, as described earlier, whether or not distributed execution can be performed is determined based on a distributed execution function and contents of settings of a system according to an embodiment. For example, while an embodiment which does not include a function for performing distributed execution of an AVERAGE syntax has been described in the present embodiment, an AVERAGE instruction may be stored in the list described above in the case of a system including a function for performing distributed execution of an AVERAGE syntax. In an embodiment in which an AVERAGE instruction is stored in the list described above, a plan node of the AVERAGE instruction is distributed execution-feasible when condition (2) is satisfied due to a lower-level plan node being a simple READ instruction or the like.

Viewing the plan tree shown in FIG. 6 in sequence from the bottommost plan node, the plan node of "READ A", the plan node of "READ B", the plan node of "JOIN AB", the plan node of "READ C", and the plan node of "JOIN ABC" are distributed execution-feasible.

When it is determined that an instruction indicated in a plan node is a distributed execution-feasible instruction, the processing advances to step S309. On the other hand, when it is determined that the instruction indicated in the plan node is not a distributed execution-feasible instruction, the processing advances to step S308. The infeasible process excluding unit 35 excludes an instruction determined by the feasibility determining unit 34 to be distributed execution-infeasible and instructions connected at a higher level than this instruction in the plan tree, from objects of the distributed execution (step S308).

In the processing described above, since an instruction determined to be distributed execution-infeasible and higher-level instructions thereof are excluded from objects of the distributed execution, determinations are efficiently made in sequence from a lower-level plan node in the plan tree. Therefore, the feasibility determining unit 34 sequentially performs determinations from a lower-level plan node toward a higher-level plan node in the plan tree (step S306). Once a determination or an exclusion is completed for all of the plan nodes (step S309), the processing advances to step S310.

In step S310, an instruction to be an object of distributed execution is determined. The object determining unit 36 determines an instruction to be an object of distributed execution in accordance with an analysis result of the plan tree. In the present embodiment, the object determining unit 36 determines an instruction determined as distributed execution-feasible by the feasibility determining unit 34 as an object of distributed execution. In the plan tree shown in FIG. 6, the plan node of "READ A", the plan node of "READ B", the plan node of "JOIN AB", the plan node of "READ C", and the plan node of "JOIN ABC" are determined as objects of distributed execution. Subsequently, the processing shown in the present flow chart is finished.

In the present embodiment, by executing the query analysis process described above, an instruction suitable for distributed execution in an environment according to the present embodiment can be appropriately determined and made an object of distributed execution.

Second Embodiment

Next, a second embodiment will be described. In the second embodiment, a case of performing distributed execution in consideration of an update during a transaction including a query which is an object of distributed execution will be described in a similar manner to the first embodiment. Moreover, in the following description and in FIG. 7 and subsequent drawings, configurations shared with the first embodiment will be denoted by similar reference characters and descriptions thereof will be omitted.

<<Configuration of System>>

Since a hardware configuration of a system according to the second embodiment is approximately similar to the hardware configuration of the system according to the first embodiment, a description thereof will be omitted (refer to FIG. 1).

Figure 7:
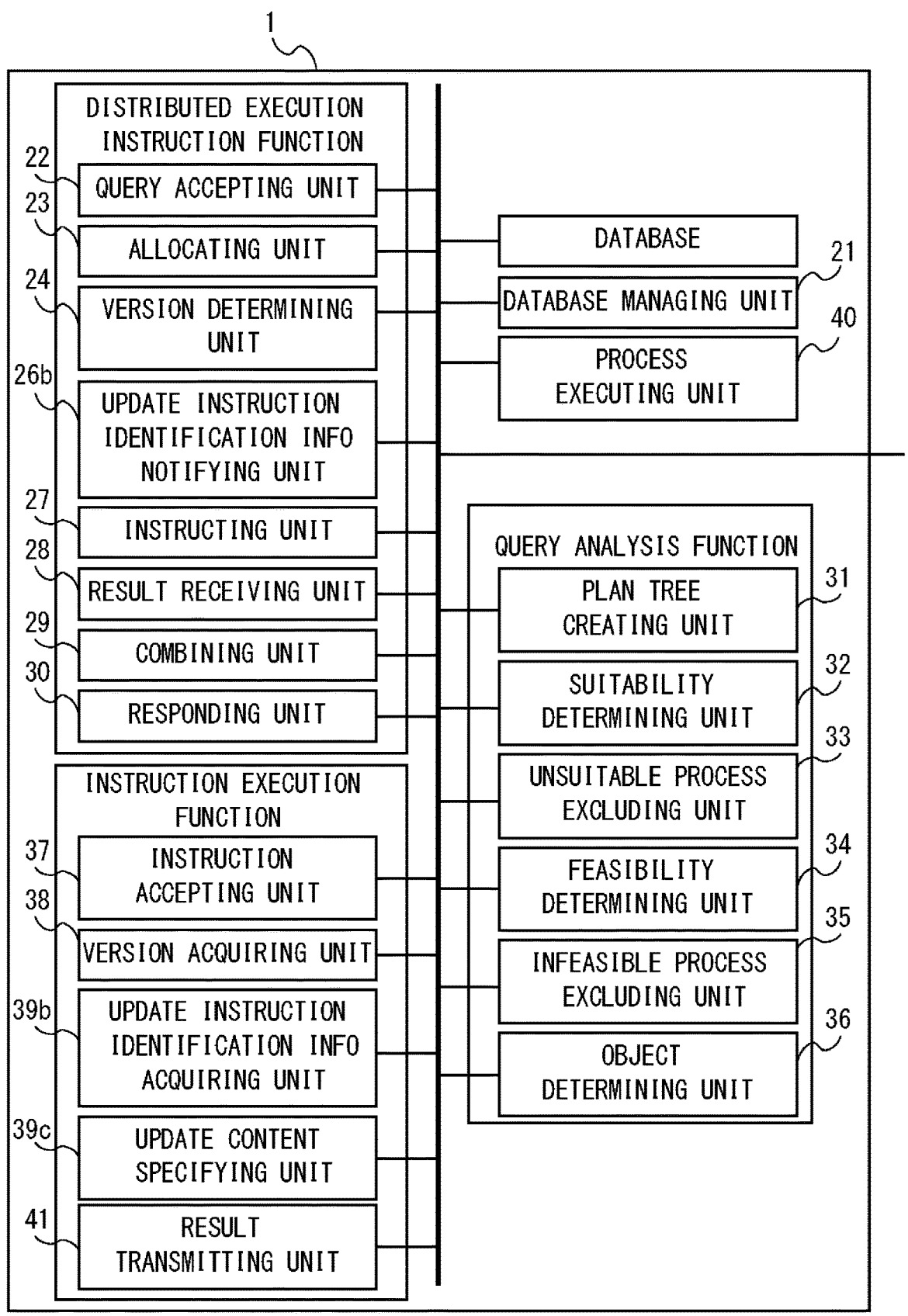
FIG. 7 is a diagram B schematically showing a functional configuration of a node according to an embodiment.

FIG. 7 is a diagram schematically showing a functional configuration of the node 1 according to the present embodiment. By having the CPU 11 interpret and execute various programs deployed in the RAM 12 and control various hardware included in the node 1 according to the present embodiment, the node 1 functions as a computer including the database managing unit 21, the query accepting unit 22, the allocating unit 23, the version determining unit 24, an update instruction identification information notifying unit 26b, the instructing unit 27, the result receiving unit 28, the combining unit 29, the responding unit 30, the plan tree creating unit 31, the suitability determining unit 32, the unsuitable process excluding unit 33, the feasibility determining unit 34, the infeasible process excluding unit 35, the object determining unit 36, the instruction accepting unit 37, the version acquiring unit 38, an update instruction identification information acquiring unit 39b, an update content specifying unit 39c, the process executing unit 40, and the result transmitting unit 41.

In other words, the node 1 according to the present embodiment differs from the node 1 according to the first embodiment in that the update instruction identification information notifying unit 26b is adopted in place of the update history creating unit 25 and the update history notifying unit 26 and the update instruction identification information acquiring unit 39b and the update content specifying unit 39c are adopted in place of the update history acquiring unit 39. In addition, although an example in which the functions of the node 1 are executed by a general-purpose CPU 11 is also explained in the present embodiment, a part of or all of these functions may be realized by one or a plurality of dedicated processors.

When a transaction including a query includes an update instruction related to a table, the update instruction identification information notifying unit 26b notifies an instruction execution node to which a portion under responsibility related to the update instruction has been allocated, of information which enables the update instruction to be identified. In a case of a system in which a same transaction ID is used among a plurality of synchronized databases, by notifying a transaction ID of a transaction including the update instruction, an instruction execution node having been notified of the transaction ID can specify the transaction related to the update instruction and refer to update contents. Moreover, in the system according to the present embodiment, since a transaction ID is used as information for identifying an update instruction because a same transaction ID is used among a plurality of databases, the information used for identification is not limited to a transaction ID and may be any information which enables an update instruction to be identified.

The update instruction identification information acquiring unit 39b acquires the transaction ID (information which enables an update instruction to be identified) notified by the update instruction identification information notifying unit 26b of the distributed execution instruction node.

The update content specifying unit 39c specifies contents updated based on the update instruction based on the transaction ID acquired by the update instruction identification information acquiring unit 39b.

In other words, in the second embodiment, by adopting transmission and reception of information which enables an update instruction to be identified (a transaction ID) in place of transmission and reception of update history adopted in the first embodiment, distributed execution in consideration of an update during a transaction including a query which is an object of distributed execution can be performed.

<<Flow of Processing>>

Next, details of processing according to the present embodiment will be described. Moreover, specific contents, a sequence, and the like of processing described in the present embodiment merely represent one example of implementing the present disclosure. Specific contents, sequences, and the like of the processing may be appropriately selected in accordance with embodiments.

Figure 8:
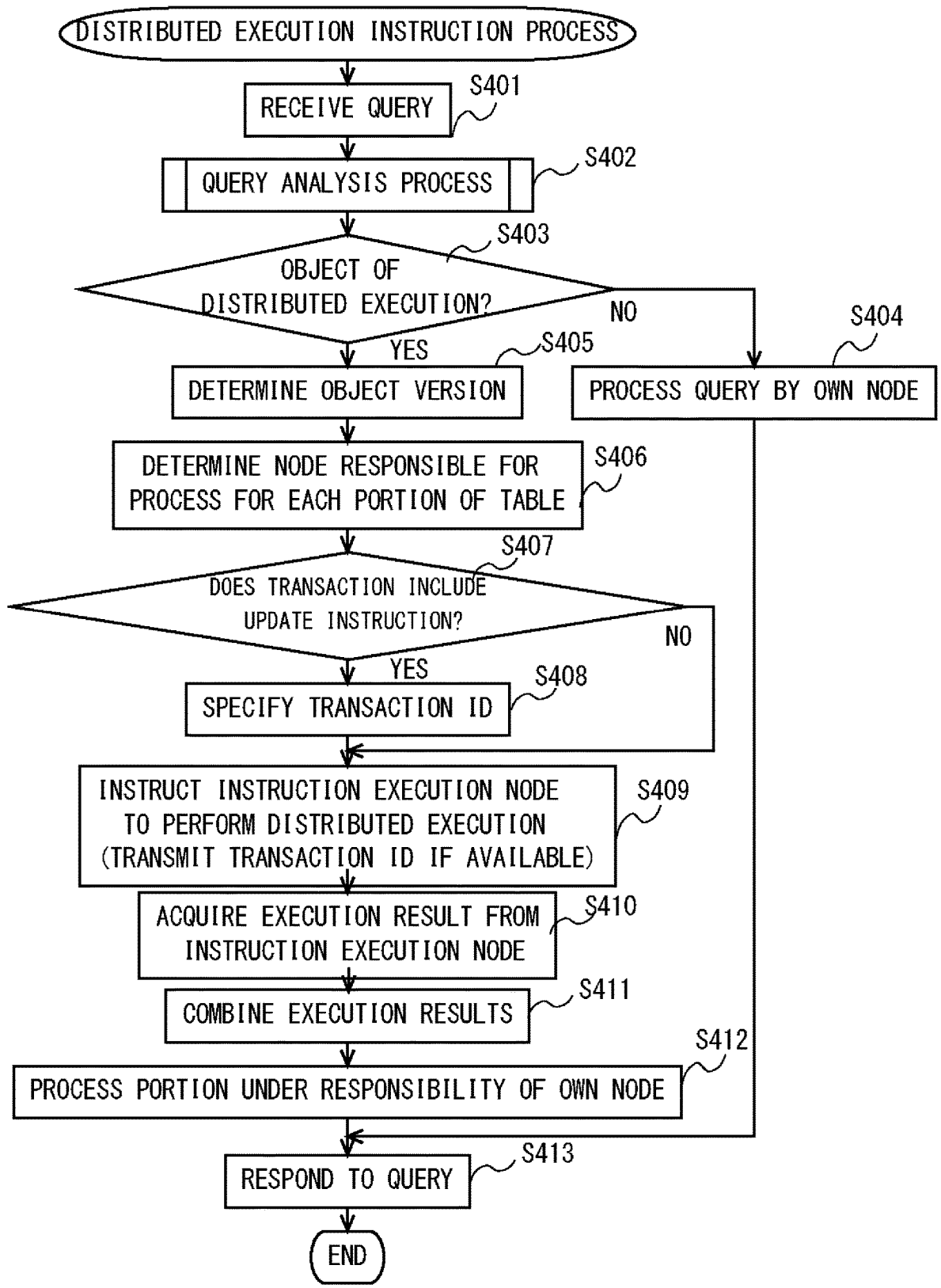
FIG. 8 is a flow chart B showing a flow of distributed execution instruction process that is executed by a node in an embodiment.

FIG. 8 is a flow chart showing a flow of distributed execution instruction process that is executed by the node 1 in the present embodiment. The processing shown in the present flow chart is started with the acceptance of a query by the node 1 as a trigger.

Since processing in steps S401 to S404 is approximately similar to the processing in steps S101 to S104 described with reference to FIG. 3 in the first embodiment, a description thereof will be omitted.

In step S405, a version used in the processing is determined. The version determining unit 24 determines the version of the table to be used in the processing. Moreover, the present embodiment adopts databases of which an entity is changed before the transaction is committed in replication, and when a transaction including a query includes an update instruction, the version determined at this point is a version representing an entity of a database having been changed due to the update instruction (which differs from the first embodiment). Subsequently, the processing proceeds to step S406.

In step S406, a division method of the table used in the processing and a node to be responsible of each divided portion are determined. Since the processing in step S406 is approximately similar to the processing in step S106 in the first embodiment, a description thereof will be omitted.

In steps S407 and S408, when a transaction related to the received query includes an update instruction of the database managed by the node, a transaction ID for identifying the update instruction is specified. The update instruction identification information notifying unit 26b determines whether or not the transaction including the query includes an update instruction related to a table (step S407), and when the transaction includes an update instruction, specifies a transaction ID of the transaction including the update instruction (step S408). Subsequently, the processing proceeds to step S409.

In step S409, instructions to instruction execution nodes are transmitted. The instructing unit 27 instructs the plurality of instruction execution nodes selected in step S406 to perform the processing with respect to portions of responsibility by referring to databases managed by the respective instruction execution nodes (these databases are synchronized with each other) and thereby causes the plurality of instruction execution nodes to perform distributed execution of the processing. In doing so, the instructing unit 27 notifies each instruction execution node of contents of the query that is the object of the distributed processing and further instructs the instruction execution node to perform the processing using the version determined by the version determining unit 24 as the version to be used in the processing. At this point, in a case where a log-based replication technique is adopted by a system according to an embodiment, the instructing unit 27 notifies a log sequence number (LSN) corresponding to the determined version so that a transaction log corresponding to the specified version can be specified.

In addition, when a transaction ID is specified in step S408 described above, the update instruction identification information notifying unit 26b notifies an instruction execution node to which a portion under responsibility related to an update instruction has been allocated of the specified transaction ID. Subsequently, the processing proceeds to step S410.

Once the instructions in step S409 are performed, the plurality of nodes having received the instructions operate as instruction execution nodes and execute the processing related to the query with respect to each portion under responsibility in accordance with instructions from the distributed execution instruction node.

Figure 9:
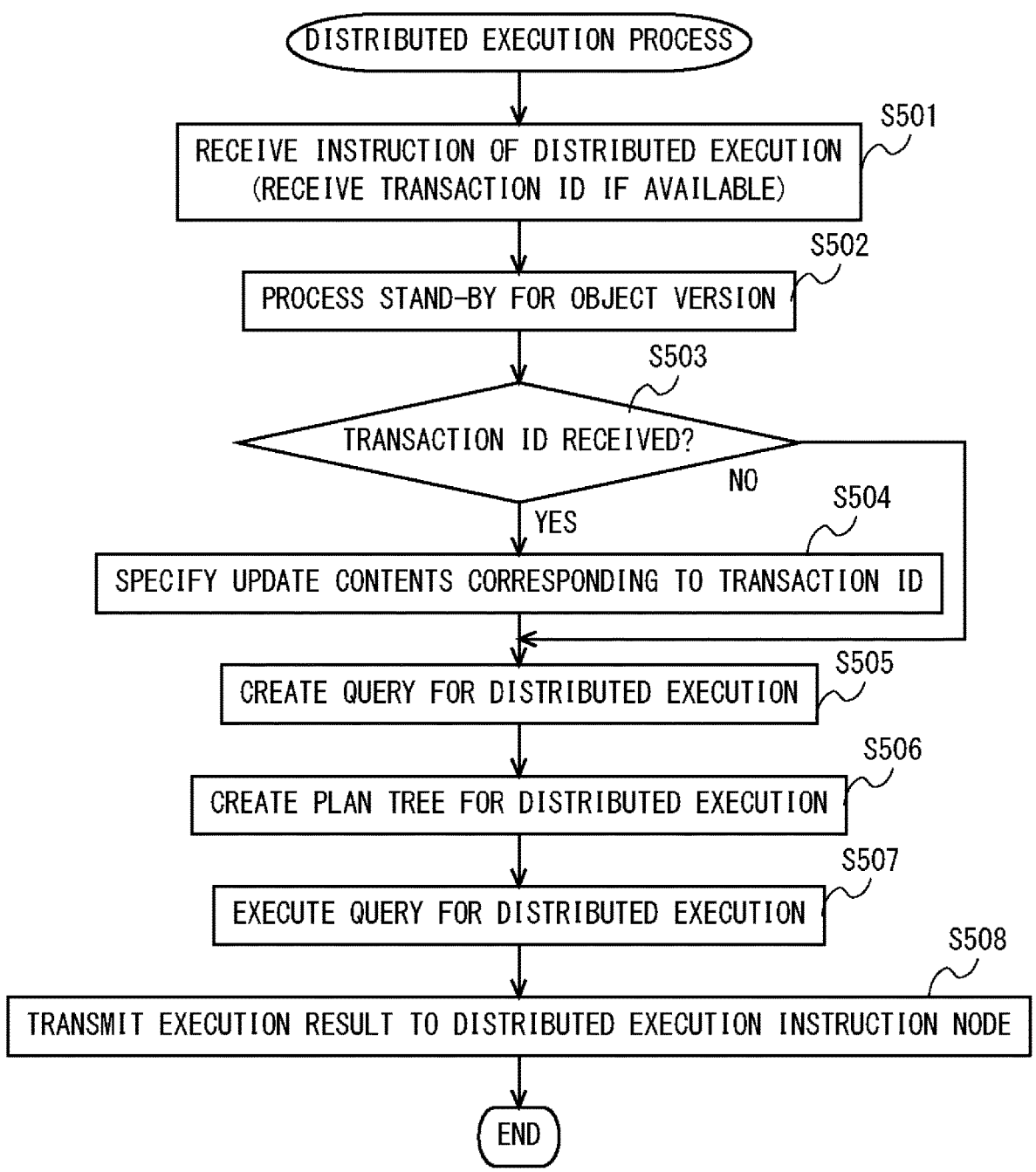
FIG. 9 is a flow chart B showing a flow of distributed execution process that is executed by a node in an embodiment.

FIG. 9 is a flow chart showing a flow of distributed execution process that is executed by the node 1 in the present embodiment. The processing shown in the present flow chart is started with the acceptance of an instruction for distributed execution transmitted from the distributed execution instruction node (refer to step S409 in FIG. 8) by the node 1 as a trigger. In other words, the present flow chart represents a flow chart in a case where a node operates as an instruction execution node.

Since processing in steps S501 and S502 is approximately similar to the processing in steps S201 and S202 described with reference to FIG. 4 in the first embodiment, a description thereof will be omitted. However, as described above, when a transaction including a query includes an update instruction related to a table, a transaction ID corresponding to the update instruction is specified and an instruction execution node to which a portion under responsibility related to the update instruction has been allocated is notified of the specified transaction ID (refer to steps S408 and S409). Therefore, when a transaction including a query includes an update instruction related to a table, the update instruction identification information acquiring unit 39b acquires a transaction ID corresponding to the update instruction from the distributed execution instruction node.

In steps S503 and S504, when a transaction ID has been acquired, update contents corresponding to the transaction ID are specified. Each instruction execution node determines whether or not a transaction ID has been acquired by the update instruction identification information acquiring unit 39b in step S501 (step S503). Subsequently, when a transaction ID has been acquired, the update content specifying unit 39c specifies contents updated based on the update instruction based on the transaction ID acquired from the distributed execution instruction node (step S504). In the present embodiment, since databases of which an entity is changed before the transaction is committed in replication are adopted, changed contents corresponding to the update instruction can be specified based on the transaction ID. On the other hand, when a transaction ID is not acquired, the processing indicated in step S504 is omitted. Subsequently, the processing proceeds to step S505.

Since processing in steps S505 and S506 is approximately similar to the processing in steps S205 and S206 described with reference to FIG. 4 in the first embodiment, a description thereof will be omitted.

In step S507, the created query for distributed execution is executed. The process executing unit 40 executes the query for distributed execution according to the plan tree for distributed execution created in step S506. Accordingly, the processing with respect to the portion under responsibility is executed by referring to the database managed by the database managing unit 21. In doing so, the process executing unit 40 performs the processing by referring to the version of the table acquired by the version acquiring unit 38. As described earlier in step S405, when a transaction including the original query includes an update instruction, the version is a version representing an entity of a database having been changed due to the update instruction.

In addition, at this point, even if replication among databases is performed and data is synchronized, an instruction execution node is generally unable to refer to update contents related to a transaction (not committed) when the transaction is being executed. In the present embodiment, an instruction execution node refers to update contents related to a transaction (not committed) being executed by referring to an changed entity of a database based on a transaction ID notified from the distributed execution instruction node. Therefore, with the system according to the present embodiment, distributed execution in consideration of an update during a transaction including a query which is an object of distributed execution can be performed. Subsequently, the processing proceeds to step S508.

In step S508, a result of execution of the query for distributed execution is transmitted. Since the processing in step S508 is approximately similar to the processing in step S208 in the first embodiment, a description thereof will be omitted. In addition, in a similar manner to the first embodiment, creation of a query for distributed execution can be omitted in the distributed execution by each instruction execution node.

Next, returning to FIG. 8, a description of processing by the distributed execution instruction node will be continued.

Since processing in steps S410 to S413 is approximately similar to the processing in steps S110 to S113 described with reference to FIG. 3 in the first embodiment, a description thereof will be omitted.

In addition, since a flow of query analysis process for determining a range of distributed execution is similar to the processing flow described with reference to FIG. 5 in the first embodiment, a description thereof will be omitted.

According to the second embodiment described above, even with a database system in which there is no guarantee that an update result during execution of a transaction is synchronized, distributed execution in consideration of an update during a transaction including a query which is an object of distributed execution can be performed. In addition, according to the second embodiment, since update contents are specified using a transaction ID, an update history need not be transmitted and received between the distributed execution instruction node and an instruction execution node.

Third Embodiment

In a third embodiment, an embodiment adoptable by a database system in which even an update result during execution of a transaction is completely synchronized will be described. When such a database system is being used, processing related to the determination of a version and standing by as described above in the second embodiment is no longer necessary.

More specifically, in the third embodiment, the version determining unit 24 and the version acquiring unit 38 in the functional configuration of the node 1 described with reference to FIG. 7 may be omitted (not shown). In addition, in the processing flow described with reference to FIGS. 8 and 9, steps S405 and S502 related to the determination of a version and standing by are no longer necessary and, in steps S409 and S501, information related to a version need not be transmitted and received (not shown).

Furthermore, in execution of a query for distributed execution in step S507, the process executing unit 40 may execute a query for distributed execution in accordance with a plan tree for distributed execution without being conscious of the version of a table. In doing so, the instruction execution node refers to update contents related to a transaction being executed based on a transaction ID notified from the distributed execution instruction node and performs distributed execution in consideration of an update during the transaction.

<Variations>

Moreover, while a method of distribution and responsibilities of processing are determined by a node having received a query and distributed to other nodes in the present disclosure, a node having received an instruction for distributed execution may be configured to be capable of further distributing a portion under responsibility allocated to the node itself and instructing the other nodes to perform the distributed execution. For example, when nodes on a system are connected so as to have a parent-child relationship on a tree, a child node having received an instruction to execute an instruction from a parent node can further instruct a lower-level node (a grandchild node) to perform distributed execution. In this case, while the child node is an instruction execution node from the perspective of the parent node, the child node is the distributed execution instruction node with respect to the grandchild node.

In addition, anode on the system may operate as a proxy node which relays an instruction for distributed execution or a result of execution. In this case, when the proxy node receives an instruction for distributed execution, the proxy node transfers the instruction to another node. The node having received the transfer operates as an instruction execution node and transmits a result of execution to the proxy node. The proxy node having received the result of execution transmits the result to the node that is a transmission source of the instruction for distributed execution.

Furthermore, while the present embodiment has been described based on a database system in which contents of databases are synchronized among a plurality of nodes by a replication technique, contents to be synchronized among the nodes by the replication technique may be parts of databases instead of entire databases. In other words, the present disclosure may be applied to a database system related to partial replication in which each node uses a replication technique to synchronize only a part of a database for which the node itself is responsible.

When performing distributed execution according to the present disclosure in such a database system, each instruction execution node notifies the distributed execution instruction node of a portion partially replicated to the instruction execution node in a database. By receiving such a notification, the distributed execution instruction node can comprehend a portion which is partially replicated to each instruction execution node. However, as a method by which the distributed execution instruction node comprehends a portion that is partially replicated to each instruction execution node, other methods such as a method in which the distributed execution instruction node refers to setting information of partial replication and a method in which the distributed execution instruction node inquires each instruction execution node may be adopted.

In the distributed execution instruction node having comprehended a portion partially replicated to each instruction execution node, in a plurality of portions included in a table used in processing related to a query, the allocating unit 23 preferentially allocates the portion as a portion under responsibility to an instruction execution node managing a database to which the portion is replicated. Accordingly, the instructing unit 27 instructs distributed execution so that the portion partially replicated to each instruction execution node becomes a portion under responsibility of distributed execution by the instruction execution node.

In the variation described above, by combining the distributed execution technique according to the present disclosure and a partial replication technique, queries can be processed as though all nodes retain an entire database without actually having to replicate the entire database to all of the nodes. In other words, according to such a variation, load can be distributed while conserving resources such as storages, networks, and processors.

Furthermore, a technique according to the present disclosure may be applied to a database system in which, while each node is capable of accessing an entire database, since a portion that can be accessed at a relatively high speed by each node is limited to a part of the database, access to other portions is only performed at a relatively low speed (in other words, a database in which access speeds differ among respective portions of the database). Such a database is a database system in which, for example, the entire database is retained in a relatively low-speed storage and each node retains only a part of the database in a relatively high-speed storage.

When performing distributed execution according to the present disclosure in such a database system, each instruction execution node notifies the distributed execution instruction node of a portion which the instruction execution node itself can access at high speed in the database. By receiving such a notification, the distributed execution instruction node can comprehend a portion which can be accessed by each instruction execution node at high speed. However, as a method by which the distributed execution instruction node comprehends a portion which can be accessed by each instruction execution node at high speed, other methods such as a method in which the distributed execution instruction node refers to setting information of each instruction execution node and a method in which the distributed execution instruction node inquires each instruction execution node may be adopted.

In the distributed execution instruction node having comprehended a portion which can be accessed by each instruction execution node at high speed, in a plurality of portions included in a table used in processing related to a query, the allocating unit 23 preferentially allocates the portion as a portion under responsibility to an instruction execution node capable of accessing the portion at high speed. Accordingly, the instructing unit 27 instructs distributed execution so that the portion which can be accessed by each instruction execution node at high speed becomes a portion under responsibility of distributed execution by the instruction execution node.

According to the variation described above, high-speed access to an entire database can be realized by using the distributed execution technique according to the present disclosure in combination with portions which can be accessed at high speed by each node.

What is claimed is:

1. An information processing device comprising:
a memory; and
a processor coupled to the memory, the processor being configured to execute:
managing a database;
creating a plan tree in which plan nodes each representing individual processing included in a query to the database are arranged in a tree shape in accordance with a sequence in which the plan nodes are to be processed;
allocating each of a plurality of portions included in a table which is an object of a divided read among the tables for which read processing is performed in any of the plan nodes, as a portion under responsibility of each of a plurality of other information processing devices;
causing the plurality of other information processing devices to perform distributed execution of the processing related to the query by instructing each of the plurality of other information processing devices to perform the processing with respect to the portion under responsibility by referring to other databases which are synchronized with the database and which are managed by the other information processing devices;
receiving results of execution of the processing related to the query with respect to the portion under responsibility from the plurality of other information processing devices;
acquiring a result of execution of the processing related to the query with respect to the table by combining the results received by the processor;
feasibility determining for determining a feasibility of the distributed execution with respect to processing represented by each plan node included in the plan tree, the feasibility determining involving determining that the processing represented by the plan node is distributed execution-feasible when the other information processing device is going to possess the information for executing the processing represented by the plan node by the time of the processing execution even if only a readout result of the portion under responsibility is utilized as to the table which is the object of the divided read among the tables for which read processing is performed in the plan node or in a plan node connected at lower level than the plan node in the plan tree;
excluding processing determined by the feasibility determining to be distributed execution-infeasible and processing connected at a higher level than this processing in the plan tree, from objects of the distributed execution; and
determining, as the object of the distributed execution, processing which is determined by the feasibility determining to be distributed execution-feasible, based on an analysis result of the plan tree.

2. The information processing device according to claim 1, wherein
the feasibility determining involves sequential determining from a lower-level node toward a higher-level node in the plan tree.

3. The information processing device according to claim 1, further comprising:
the processor being configured to execute:
suitability determining for determining a suitability of the distributed execution with respect to processing represented by each node included in the plan tree; and
excluding processing determined by the suitability determining to be unsuitable for the distributed execution and processing connected at a lower level than this processing in the plan tree, from objects of the distributed execution.

4. The information processing device according to claim 3, wherein
the suitability determining involves sequential determining from a higher-level node toward a lower-level node in the plan tree.

5. A method for causing a computer to execute:
managing a database;

creating a plan tree in which plan nodes each representing individual processing included in a query to the database are arranged in a tree shape in accordance with a sequence in which the plan nodes are to be processed;

allocating each of a plurality of portions included in a table which is an object of a divided read among the tables for which read processing is performed in any of the plan nodes, as a portion under responsibility of each of a plurality of other information processing devices;

causing the plurality of other information processing devices to perform distributed execution of the processing related to the query by instructing each of the plurality of other information processing devices to perform the processing with respect to the portion under responsibility by referring to other databases which are synchronized with the database and which are managed by the other information processing devices;

receiving results of execution of the processing related to the query with respect to the portion under responsibility from the plurality of other information processing devices;

acquiring a result of execution of the processing related to the query with respect to the table by combining the results received by the result receiving;

feasibility determining for determining a feasibility of the distributed execution with respect to processing represented by each plan node included in the plan tree, the feasibility determining involving determining that the processing represented by the plan node is distributed execution-feasible when the other information processing device is going to possess the information for executing the processing represented by the plan node by the time of the processing execution even if only a readout result of the portion under responsibility is utilized as to the table which is the object of the divided read among the tables for which read processing is performed in the plan node or in a plan node connected at lower level than the plan node in the plan tree;

excluding processing determined by the feasibility determining to be distributed execution-infeasible and processing connected at a higher level than this processing in the plan tree, from objects of the distributed execution; and determining, as the object of the distributed execution, processing which is determined by the feasibility determining to be distributed execution-feasible, based on an analysis result of the plan tree.

6. A computer-readable non-transitory medium on which is recorded a program for causing a computer to execute:

managing a database;

creating a plan tree in which plan nodes each representing individual processing included in a query to the database are arranged in a tree shape in accordance with a sequence in which the plan nodes are to be processed;

allocating each of a plurality of portions included in a table which is an object of a divided read among the tables for which read processing is performed in any of the plan nodes, as a portion under responsibility of each of a plurality of other information processing devices;

causing the plurality of other information processing devices to perform distributed execution of the processing related to the query by instructing each of the plurality of other information processing devices to perform the processing with respect to the portion under responsibility by referring to other databases which are synchronized with the database and which are managed by the other information processing devices;

receiving results of execution of the processing related to the query with respect to the portion under responsibility from the plurality of other information processing devices;

acquiring a result of execution of the processing related to the query with respect to the table by combining the results received by the result receiving;

feasibility determining for determining a feasibility of the distributed execution with respect to processing represented by each plan node included in the plan tree, the feasibility determining involving determining that the processing represented by the plan node is distributed execution-feasible when the other information processing device is going to possess the information for executing the processing represented by the plan node by the time of the processing execution even if only a readout result of the portion under responsibility is utilized as to the table which is the object of the divided read among the tables for which read processing is performed in the plan node or in a plan node connected at lower level than the plan node in the plan tree;

excluding processing determined by the feasibility determining to be distributed execution-infeasible and processing connected at a higher level than this processing in the plan tree, from objects of the distributed execution; and determining, as the object of the distributed execution, processing which is determined by the feasibility determining to be distributed execution-feasible, based on an analysis result of the plan tree.

* * * * *